US008112219B2

(12) United States Patent
Johnson et al.

(10) Patent No.: US 8,112,219 B2
(45) Date of Patent: Feb. 7, 2012

(54) SYSTEM FOR AND METHOD OF MONITORING REAL TIME TRAFFIC CONDITIONS USING PROBE VEHICLES

(75) Inventors: Richard A. Johnson, Rochester Hills, MI (US); Martin A. Ferman, Huntington Woods, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1037 days.

(21) Appl. No.: 11/272,577

(22) Filed: Nov. 11, 2005

(65) Prior Publication Data

US 2007/0112503 A1 May 17, 2007

(51) Int. Cl.
*G06F 19/00* (2011.01)
*G01C 21/00* (2006.01)
*G01C 21/30* (2006.01)

(52) U.S. Cl. ........ 701/117; 701/119; 701/408; 701/409; 701/410; 701/411; 701/414

(58) Field of Classification Search ...... 701/1, 117–119, 701/200–201, 207–210; 340/909–911, 917, 340/931, 988–993, 995.12, 995.13; 342/357.07, 342/357.09
See application file for complete search history.

(56) References Cited

U.S. PATENT DOCUMENTS 5,164,904 A 11/1992 Sumner
5,182,555 A 1/1993 Sumner
5,539,645 A 7/1996 Mandhyan et al.
6,012,012 A 1/2000 Fleck et al.
6,061,625 A * 5/2000 Fastenrath .................... 701/117
6,092,020 A 7/2000 Fastenrath et al.
6,178,374 B1 * 1/2001 Mohlenkamp et al. ....... 701/117
6,255,963 B1 * 7/2001 Heimann et al. .............. 340/905
6,873,905 B2 * 3/2005 Endo et al. .................... 701/202
6,915,207 B2 * 7/2005 Nakano ......................... 701/209
2004/0203696 A1 * 10/2004 Jijina et al. .................... 455/420
2005/0171683 A1 * 8/2005 Irie et al. ....................... 701/117
2007/0093247 A1 * 4/2007 Yaqub .......................... 455/436

FOREIGN PATENT DOCUMENTS

EP 1209644 5/2002

OTHER PUBLICATIONS

Breitenberger, S., Neuherz, M. Kates, R. and Gruber, B., Dec. 2004, Traffic Information Potential and Necessary Penetration Rates, Traffic Engineering and Control, 45 (11), 396.

(Continued)

*Primary Examiner* — Khoi Tran
*Assistant Examiner* — Bao Long T Nguyen

(57) ABSTRACT

A system and method for updating and communicating traffic information to at least one receiving vehicle includes a traffic information center and at least one probe vehicle. In a preferred embodiment, major road sections are represented as links, the center stores and updates a parent map database of links that are associable with a first value of a condition, each probe vehicle is configured to receive a copy of the database either periodically or upon request, determine a second value of the condition, and compare the first and second values to determine a condition discrepancy. Where the discrepancy surpasses a threshold, each probe vehicle is further configured to upload at least the second value to the center, so as to update the parent map database.

14 Claims, 4 Drawing Sheets

OTHER PUBLICATIONS

Khan, S., Thanasupsin, K. Griffin, R. (2001) "A real-time demonstration prototype to estimate link travel time and speed . . . Rural 1-70 Corridor in Colo." ITSA, Miami, Fl.
SAI (2000). "Automated vehicle Identification tags in San Antonio", Science Applicatins Interntional Corp., McLean, VA., 2000.
Saricks, C., Belella, P., Koppelman, F., Schofer, J & Sen, A. (1996). "Formal evaluation of the ADVANCE targeted deployment", Intel Trans: Realizing the Benefits, Houston, TX.
Sen, A., Sóót, S. and Berka, S. (1997)). "Appendix H: Probes and detectors: Experience gained from ADVANCE", Document #8465. Adv.01—App H.
Sen, A., Thakuriah, P., Zhu, X., and Karr, A. (1997). "Frequency of probe reports and variance of travel time estimates", J Trans Eng., 290-297.
A Simple Analytical Model of a Probe-Based Traffic Information System, Ferman, Martin A., Blumenfeld, Dennis E. and Dai, Xiaowen, Proceedings, 2003 IEEE International Conf. on Intelligent Transportation Systems, p. 263, Oct. 13, 2003, Shanghai, China. Also published in *J. Intelligent Transportation Systems*, 9(1):23-34, 2005 (journal publication was longer, more complete).
A Simulation Evaluation of a Real-Time Traffic Information System Using Probe Vehicles, Dai, Xiaowen, Ferman, Martin A. and Roesser, Robert P., Proceedings, 2003 IEEE International Conf. on Intelligent Transportation Systems, p. 475, Oct. 13, 2003, Shanghai, China.

* cited by examiner

SYSTEM FOR AND METHOD OF MONITORING REAL TIME TRAFFIC CONDITIONS USING PROBE VEHICLES

TECHNICAL FIELD

The present invention relates to systems for and methods of collecting traffic data using probe vehicles, and more particularly, to a system for and method of delivering traffic data to a plurality of vehicles and selectively updating the traffic data using a plurality of probe vehicles and a traffic information center.

BACKGROUND OF THE INVENTION

It is known in the prior art to use vehicles as probes for measuring traffic conditions in real-time. Individual vehicles provide "floating car data," such as, for example, the vehicle's time, speed, position, and heading, which can be used to estimate travel time and traffic speed, and which can in turn be used as an online indicator of road network status, as a basis for detecting incidents, or as input for a dynamic route guidance system.

With reference to FIG. 1 (PRIOR ART), an exemplary prior art probe vehicle system 10*a* typically includes a plurality of probe vehicles 12*a*; technology 14*a* for determining each probe vehicle location, such as, for example, a system using orbiting satellites, such as the Global Positioning System (GPS), a system using cellular telephones, or a system using radio-frequency identification (RFID); and a wireless communication system 16*a* for allowing communication between the vehicles 12*a* and a traffic information center (TIC) 18*a*. Typically, the center 18*a* receives and processes the data generated by the probe vehicles 12*a*, and then transmits the data to a plurality of receiving vehicles, which may further include non-probe vehicles 20*a*. Constant communication between the probe vehicles 12*a* and the center 18*a* requires the storage of a voluminous amount of data.

One type of traffic control system categorizes geographic thoroughfare sections as links and utilizes generally constant probe vehicle data within a set of link coordinates to reach a general link condition. Other receiving vehicles located upon the link receive the pre-determined general condition, which is constantly being updated by the probe vehicles upon the link. Using traffic simulation methods, different studies have provided widely varying estimates of the number of probe vehicles needed to accurately determine a general link condition. These studies indicate that, on a freeway, for example, 2% to 7% of the vehicles present must be probe vehicles providing data in order to determine real-time traffic conditions with a sufficiently high level of confidence. Even in this configuration, however, an exceedingly large number of probe vehicles are typically required to communicate with the center to transmit and store large amounts of data; and here, again, exceedingly substantial data processing capacity remains necessary at the center to process a large volume of incoming data in real-time.

In another prior art configuration, the transmission of traffic data between the center and vehicles is reduced by limiting transmissions to instances where one of a pre-determined set of conditions is achieved. In other words, the probe vehicle communicates traffic data to the center only when sensors indicate that at least one of a plurality of triggering conditions exist. However, like the other traffic control systems, this configuration requires that large sets of data, i.e. pre-determined triggering condition data, be stored on-board each probe vehicle.

SUMMARY OF THE INVENTION

Responsive to these and other concerns presented by conventional probe vehicle traffic control systems, the present invention presents a traffic control system for and method of selectively updating and transmitting traffic data to a plurality of receiving vehicles upon a link. Among other things, the present invention is useful for reducing the amount of transmitted and on-board stored data during traffic control operation. The reduction in data management enables the available system resources and capacity at both the traffic control center and participating vehicles to be reduced, and the reduced traffic further provides a more efficiently operating and faster communication system.

A first aspect of the invention concerns a traffic control system for updating and communicating at least one condition to at least one receiving vehicle upon a thoroughfare. The system includes a data control center configured to determine and store a first value of the condition, and at least one probe device communicatively coupled to the center, and configured to determine a probed value of the condition. The center is configured to transmit to said at least one probe device the first value of the condition. Each probe device is further configured to compare the first and probed values of the condition, so as to determine a condition discrepancy, and transmit the probed value to the center, where the discrepancy is greater than a pre-determined discrepancy threshold. The center is further configured to modify the first value of the condition upon receipt of the probed value from said at least one probe device, and transmit the modified first value to said at least one receiving vehicle.

A second aspect of the present invention concerns a traffic control system for updating and communicating at least one condition to at least one receiving vehicle upon a link, wherein said link is pre-defined. In this embodiment, the data control center further includes a map database of a plurality of links, and is configured to determine and store a first value of the condition for each link. The center is further configured to periodically transmit to said at least one probe device an electronic copy of the database. The probe device is further configured to determine its current position upon the map database. Finally, the center is configured to modify the first value of the condition upon receipt of the probed value from the probe device, and transmit a modified database to at least one receiving vehicle.

Thus, it will be appreciated and understood that the system and method of the present invention provides a number of improvements and advantages over the prior art, including for example, reducing on-board data storage requirements, the number of simultaneous communication channels required to report probe vehicle data to the receiving center, and reducing the amount of such data which must be processed in real-time at the receiving center.

These and other features of the present invention are discussed in greater detail in the section below titled DESCRIPTION OF THE PREFERRED EMBODIMENT(S).

BRIEF DESCRIPTION OF THE DRAWINGS

A preferred embodiment of the present invention is described in detail below with reference to the attached drawing figures, wherein.

DESCRIPTION OF THE PREFERRED EMBODIMENT(S)

Figure 1:
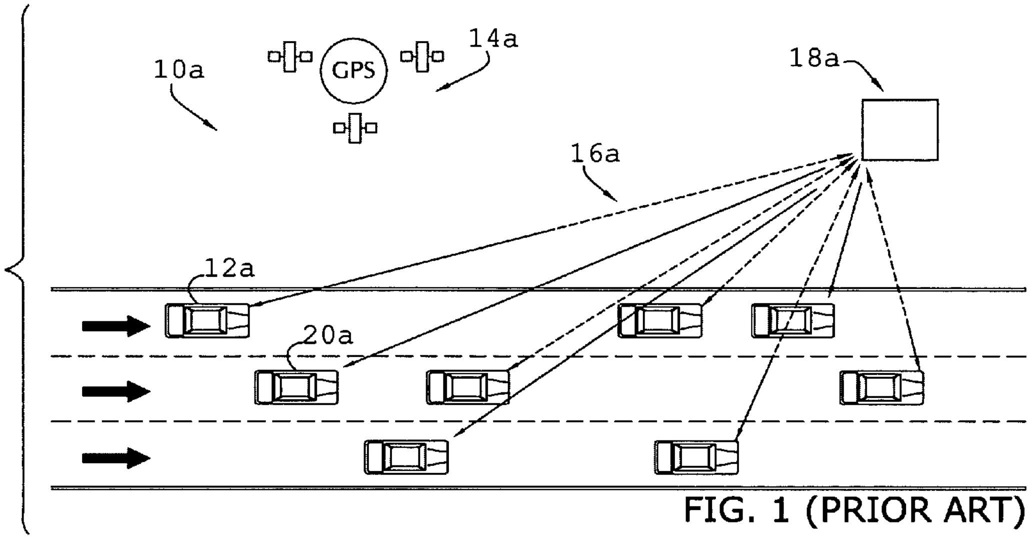
FIG. 1 (PRIOR ART)
FIG. 1 (PRIOR ART) is a depiction of a prior art system for collecting traffic data using probe vehicles, wherein each of a plurality of probe vehicles operates substantially independently and separately reports its local traffic data to a receiving center.
Figure 2:
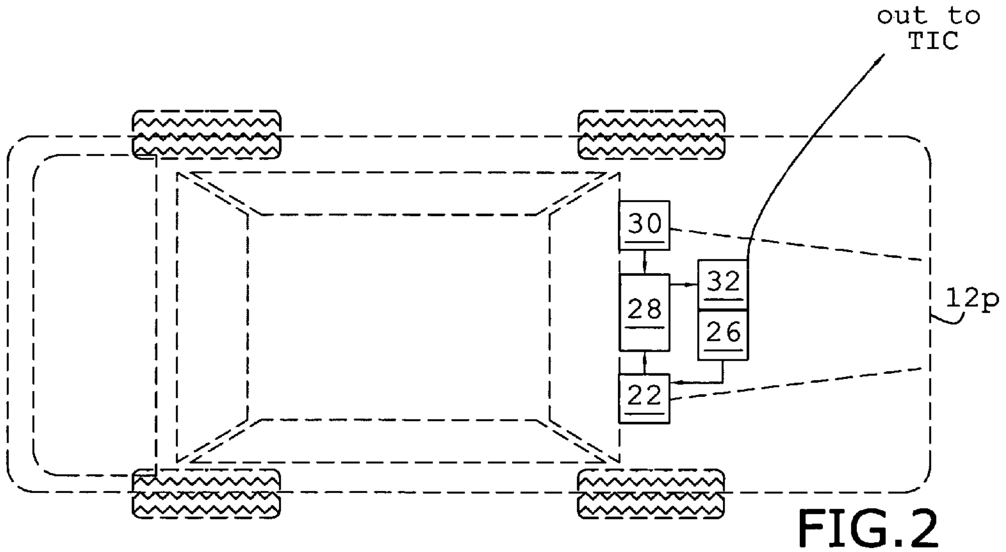
FIG. 2 is a plan view and block diagram of a preferred embodiment of a probe vehicle in accordance with a preferred embodiment of the invention.

The present invention concerns an improved traffic control system 10 adapted for use with a vehicle 12, and by an operator 14. The system 10 further includes a central Traffic Information Center (TIC) 16, and wireless communication means 18 for bilaterally delivering electronic signals between the TIC and vehicle 12. In general, the inventive system 10 is configured to relay a first value of a traffic or other type of condition to the vehicle 12, and modify the first value by selectively receiving updates based on a comparison of the first value and a determined second value. The system 10 is described and illustrated herein with respect to an automotive vehicle (see, FIG. 2), however, it is appreciated by those ordinarily skilled in the art that the system may be used in conjunction with other devices, transportation machines and modes, such as boats, aircrafts, and human motility. The function and operation of the system 10 is described herein with respect to one vehicle 12, however, it is further appreciated that the preferred TIC 16 is configured to concurrently communicate as described with a plurality of properly configured vehicles 12.

Figure 3:
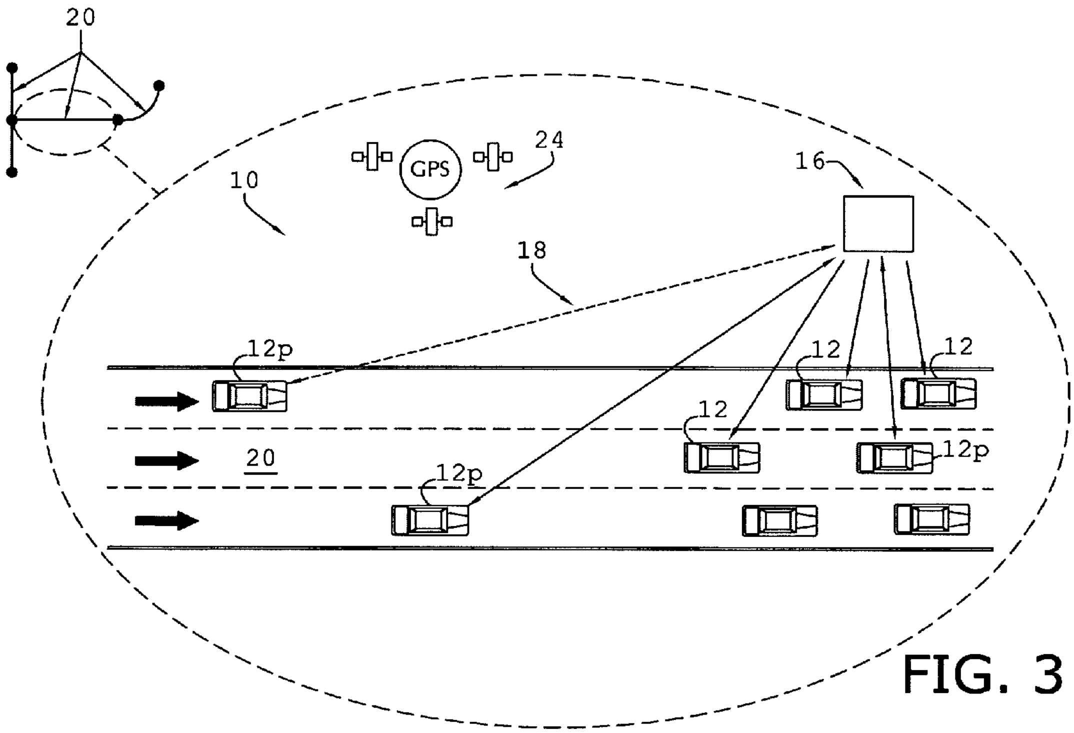
FIG. 3 is a depiction of a traffic control system in accordance with a preferred embodiment of the present invention, particularly illustrating a TIC receiving data from probe vehicles, and transmitting data to receiving vehicles.
Figure 4:
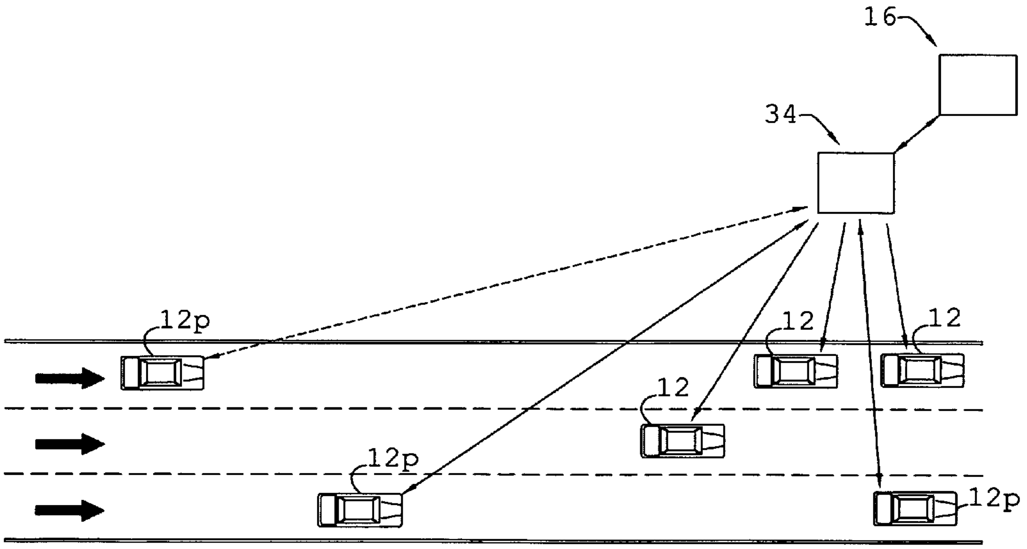
FIG. 4 is a plan view of a second preferred embodiment of the system, wherein the probe vehicles first communicate with a probe device communicatively coupled to the TIC.
Figure 5:
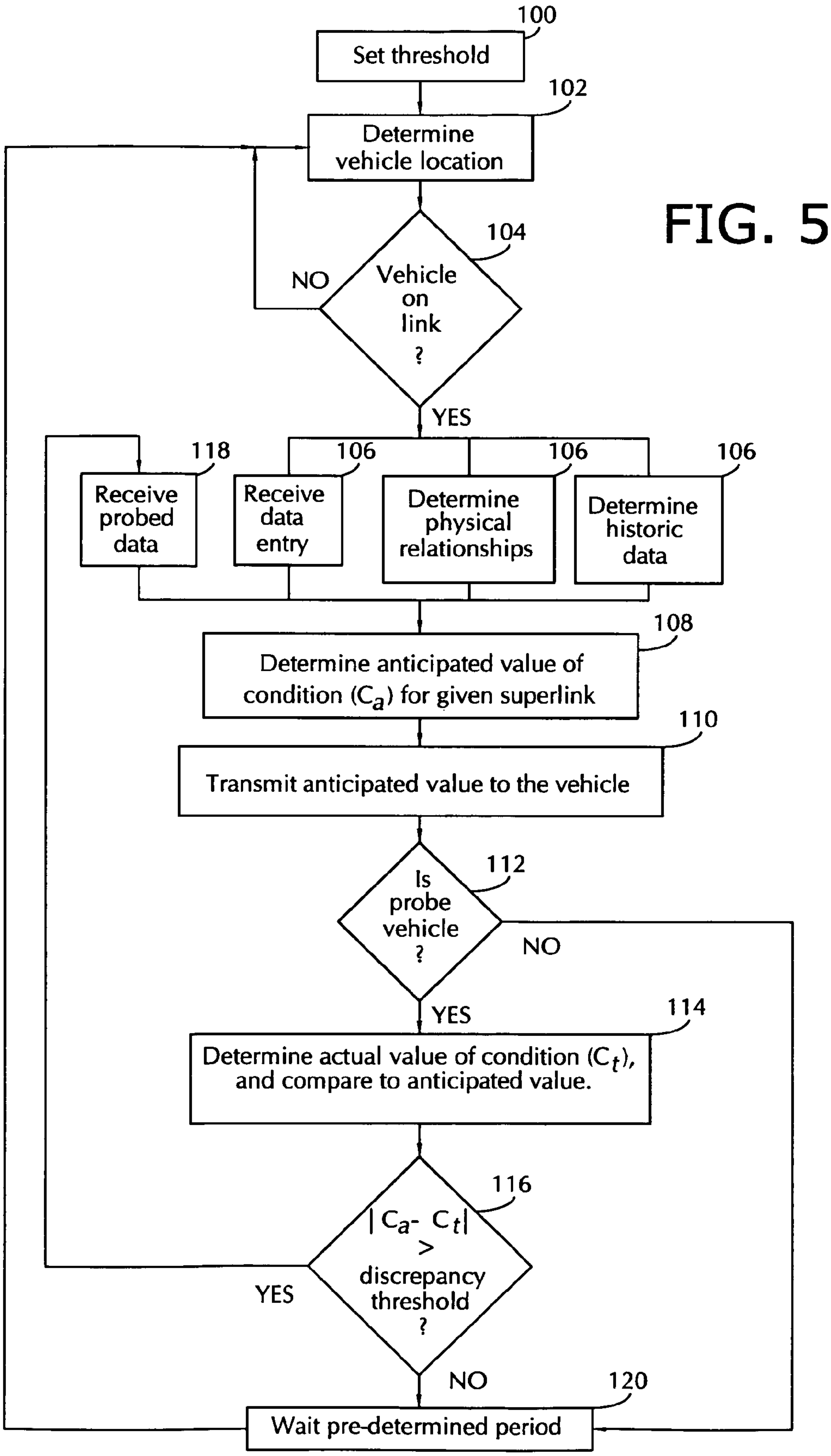
FIG. 5 is a flow chart of a method of collecting traffic control data using probe vehicles in accordance with a preferred embodiment of the present invention.

In a preferred embodiment shown in FIGS. 3 through 5, the system 10 functions to periodically broadcast current anticipated condition values, such as the average travel speed of a pre-defined thoroughfare section or link 20 to a plurality of vehicles 12. In this configuration, the TIC 16 is configured to maintain and transmit to the vehicles 12 at least a portion of a map database (not shown), either continuously, periodically, or upon request. The map database comprises of a plurality of interconnected links 20, wherein each link 20 is associated with current anticipated values for at least one condition. Each vehicle 12 is preferably configured to receive and store an electronic copy of at least a portion of the database in a storage device 22, so as to present a vehicle map.

The system 10 further includes a locator device 24 that is configured to locate the position of at least a portion of the vehicles 12 upon the vehicle map. For example, as shown in FIG. 3, for each such vehicle the locator device 24 may include a Global Positioning System (GPS) receiver 26 communicatively coupled to orbiting satellites. Alternatively, the locator device 24 may utilize a dead-reckoning system, network of cellular telephones, or a system using radio-frequency identification (RFID). When a vehicle 12 is positioned upon a link 20, the corresponding anticipated value of the condition is identifiable by a vehicle controller 28.

These locatable vehicles are further configured to selectively provide feedback to the TIC 16, so as to present probe vehicles 12*p*. Each probe vehicle 12*p* is configured to determine a second value of the condition. More preferably, each probe vehicle 12*p* includes at least one sensor 30 that is communicatively coupled to the controller 28 and configured to detect an actual value of the condition. The controller 28 is further configured to compare the anticipated and actual values, so as to determine a condition discrepancy. The preferred comparison algorithm may determine a percentage ratio, absolute difference or combination thereof to determine the condition discrepancy. The discrepancy is then compared to a discrepancy threshold. Finally, to provide adjustability where desired (i.e. less traveled versus crowded links), the comparison algorithm and/or threshold are preferably modifiable by either the operator 14 or TIC 16. More preferably, a comparison algorithm factor or the threshold may be automatically adjusted to a link factor or link threshold, once the vehicle 12*p* enters the link.

The probe vehicle 12*p* includes suitable transmissions means for transmitting the actual value back to the TIC 16 center, when the discrepancy exceeds the threshold. More preferably, the probe vehicle 12*p* includes a long range wireless communication processor or communicator 32 that is capable of real-time processing and transmission. Suitable transmission technology for this purpose include cellular data channels or phone transmissions, broadcast technologies, such as FM/XM frequencies, local and nation-wide wireless networks, such as the Internet, and mobile radio communication systems, such as GSM (Global System of Mobile Communication), GPRS (General Packet Routing System), and UMTS (Universal Mobile Telephone System). Where at least one intermediary amplification or repetitive probe station 34 is incorporated as shown in FIG. 4, additional shorter range technologies, such as a Dedicated Short Range Communication (DSRC) system or a Short Message System (SMS), may be utilized by the probe vehicles 12*p*. In this configuration, the intermediary probe station 34 preferably includes the long-range communicator 32 and communicates with the TIC 16. The TIC 16 may be configured to communicate directly back to the vehicles 12 or as shown in FIG. 4, also through the station 34. Finally, in a preferred embodiment, the medium- to long-range communication capability of the communication processor 32 may only be enabled when and while the probe vehicle 12*p* is in a pre-determined condition (e.g. in gears greater than second) and disabled at all other times.

The communication processor 32 is provided with a predefined message protocol for accomplishing the functions relating to operation of the present invention. Implementation of the communication processor 32, and particularly the message protocol, can involve substantially conventional techniques and is therefore within the ability of one with ordinary skill in the art without requiring undue experimentation.

Thus, the implemented probe vehicles 12*p* download the data for the link upon which they are traveling and compare the anticipated TIC data to its own speed, position (e.g., latitude and longitude, and heading) or other applicable parameter. If there is a significant discrepancy between the downloaded data and the actual comparable data, the probe vehicle 12*p* reports the discrepancy to the TIC 16 by uploading the actual speed, position or other discrepant data. If there is no discrepancy, no transmission to the TIC 16 is performed. By limiting the transmissions to discrepancies only, it is appreciated that the frequency and volume of data that must be uploaded from the probe vehicles 12*p* is reduced. This in turn reduces the number of simultaneous communication channels required to report the data to the TIC 16 and reduces the amount of data, which must be processed in real-time at the TIC 16. It is also appreciated that comparing data received from the TIC 16 and reporting only the significant discrepancies reduces probe vehicle onboard data storage requirements.

The actual data are collected and considered to update the database at the TIC 16 and is therefore used to generate a new anticipated condition. This actual feedback data can be used in sophisticated algorithms as a function of such major parameters as: time of day, day of the week, current or expected weather conditions, occurrence of construction or sporting events, and other relevant factors in the area around a given link to determine the anticipated conditions. Other inputs such as third party data entry at the TIC 16, physical relationships and computational conclusions based on road geometry and other parameters, as well as historic data may also be utilized to determine or refine the anticipated value of the condition.

Once probe vehicle feedback data has been collected for a pre-determined period (i.e. 5 minutes, 30 minutes, etc.), depending upon the volatility of the condition, and the anticipated value of the condition has been updated, the TIC 16 is configured to re-transmit the updated anticipated values to the designated receiving vehicles 12.

In addition to or lieu of the speed condition described herein, the system 10 may be configured to determine other discrepant conditions, such as excessive lateral acceleration (LA) where slippery conditions are present (i.e. where rain is sensed). In an LA determining configuration, previously anticipated safe driving conditions may be transmitted to a probe vehicle 12*p* on a curved link by the TIC 16. The probe vehicle 12*p* determines corresponding actual conditions, such as vehicle velocity, lateral velocity, and sideslip angles by a plurality of sensors (not shown). Where a discrepant vehicle velocity upon a curve during a rainfall event is not accompanied with anticipated discrepant lateral velocity and/or sideslip feedback, the driving conditions may be transmitted to the center and updated to reflect a less dangerous road state. It is appreciated, however, that this configuration may require a larger factor of safety given the vast differences in vehicle handling capabilities.

In exemplary but non-limiting use and operation, a method of performing the present invention, wherein only the anticipated values of a selected condition are transmitted to receiving vehicles 12 located upon a link 20 may be implemented to function as follows. Referring to FIG. 5, the method begins at a step 100 wherein the threshold is set for probe vehicles 12*p*. At a step 102, the TIC 16 determines the location of the vehicle 12 preferably through communications means 18. Next, at a step 104, it is determined whether the position of the vehicle 12 corresponds to a link 20 upon the map database. If the vehicle 12 is not positioned upon a link 20, the method returns to step 102 as the vehicle travels. Otherwise, the method continues to parallel data consideration steps shown as 106*a-c* in FIG. 5, wherein link specific data are determined or received. At step 108 the anticipated value of the condition is determined from any combination of parallel steps 106*a-c*, and at step 110 is transmitted to the vehicle 12.

At step 112, whether the vehicle 12 further presents a probe vehicle 12*p* is determined. If the vehicle 12 is also a probe vehicle 12*p*, the method proceeds to step 114 where the probe vehicle 12*p* determines an actual value of the condition and compares the actual and anticipated values to determine a condition discrepancy. For example, as shown in FIG. 5, the absolute difference between the actual and anticipated values can be determined. If the vehicle 12 is not a probe vehicle 12*p* then the method skips ahead to step 120 and undergoes a waiting period prior to returning to step 102.

At step 116, the probe vehicle 12*p* compares the condition discrepancy to a discrepancy threshold to determine a non-compliant actual condition. If the threshold is exceeded, the probe vehicle 12*p* transmits probed data to the TIC 16 for consideration at step 118 in determining future anticipated values of the condition. Step 118 is preferably performed in parallel to steps 106*a-c*, so that a new anticipated value can be determined solely from the received actual probe values or from a combination of probe values and the other data considerations. The probe data preferably includes the actual value, as well as the probe vehicle position, time, date, and day of the transmission. If the discrepancy does not exceed the threshold, then the method proceeds to step 120, and undergoes the waiting period prior to returning to step 102. It is appreciated that the waiting period provides sufficient time for a useful sample of probe vehicle data to be received and utilized to refine the anticipated values.

Figure 6:
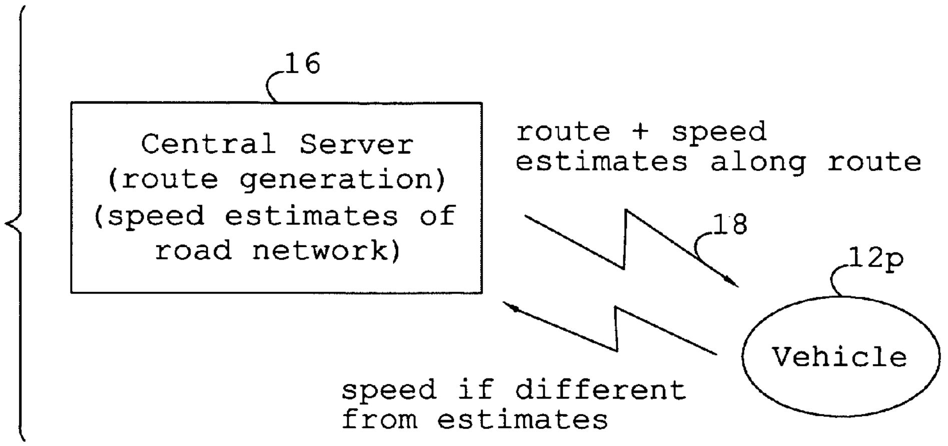
FIG. 6 is a plan view of a preferred embodiment of the system including a receiving center, locator device, and pluralities of probe and receiving vehicles upon a link.

In an alternative embodiment, the TIC 16 may be configured to transmit the first value to the vehicle 12 only upon request from the vehicle 12. In this configuration, at step 102, the TIC 16 determines the location of the vehicle 12 preferably by receiving the position data from the vehicle 12 along with the request for information. More particularly, the TIC 16 may be further configured to determine and store first values of anticipated speeds for a plurality of thoroughfares upon a map database, and the vehicle 12 may be configured to receive a route request from the operator 14, and transmit the request to the TIC 16 (see, FIG. 6). Upon receipt, the TIC 16 is configured to determine and transmit the route and anticipated speed data along the route back to the vehicle 12. As previously discussed, where the vehicle 12 further presents a probe vehicle 12*p*, actual speed data can be determined, compared to the anticipated speed data received, and fed back to the TIC 16 where exceeding a discrepancy threshold.

Figure 7:
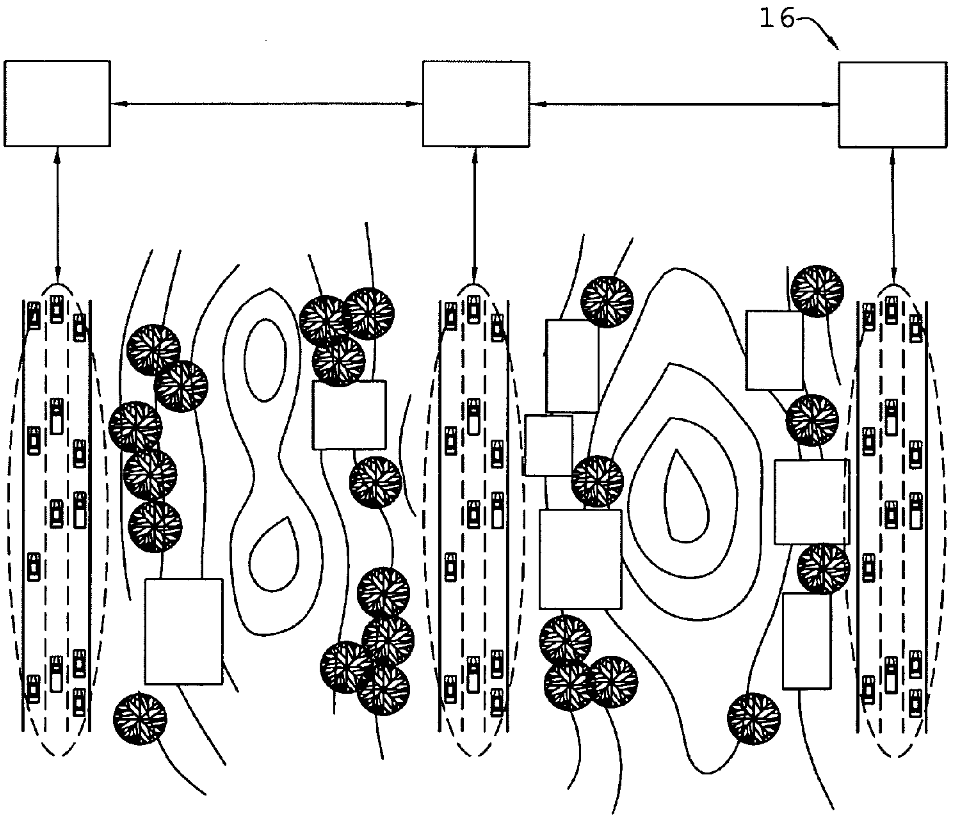
FIG. 7 is a plan view of a third preferred embodiment of the system, wherein the system includes a plurality of communicatively coupled centers each further communicatively coupled to a separate set of probe vehicles.

To accommodate route requests spanning obstructions, and/or distances greater than the long-range communication capabilities of the communicator 32, the preferred system 10 further includes a plurality of TIC's 16, as shown in FIG. 7. The TIC's 16 are strategically spaced, so as to minimize the number of TIC's for a given area of coverage. Each TIC 16 is communicatively coupled to and maps separate pluralities of vehicles 12 and links 20. The TIC's 16 are communicatively coupled to each other, so that a vehicle 12 can request and receive route and anticipated condition data from other geographic locations. It is appreciated, that this configuration facilitates interstate travel, and can alert an operator at a first location, such as Kansas City, to an anticipated travel time for a link 20 located at a second remote location, such as Detroit. Finally, each receiving vehicle 12 in this configuration is preferably operable to adjustably determine the most proximate TIC 16.

In yet another embodiment, the TIC 16 may be configured to continuously or periodically broadcast the updated map database and anticipated condition values within an operating area. In this configuration, the vehicle 12 is configured to automatically receive at least a portion of the database and anticipated values from the broadcast without request. Again, as previously discussed, where the vehicle 12 further presents a probe vehicle 12*p*, an actual condition value can be determined, compared to the anticipated value received, and fed back to the TIC 16 where exceeding a discrepancy threshold, so as to provide feed back data.

The preferred forms of the invention described above are to be used as illustration only, and should not be utilized in a limiting sense in interpreting the scope of the present invention. Obvious modifications to the exemplary embodiments and methods of operation, as set forth herein, could be readily made by those skilled in the art without departing from the spirit of the present invention. The inventors hereby state their intent to rely on the Doctrine of Equivalents to determine and assess the reasonably fair scope of the present invention as pertains to any system or method not materially departing from but outside the literal scope of the invention as set forth in the following claims.

What is claimed is:

1. A traffic control system for updating and communicating at least one condition to at least one receiving vehicle upon a thoroughfare link, wherein the condition presents link specific data, said system comprising:

a traffic information center configured to determine and store a first value of the condition; and at least one probe vehicle communicatively coupled to the center, and configured to determine a probed value of the condition;

said center being configured to transmit to said at least one probe vehicle the first value of the condition, said at least one probe vehicle being further configured to compare the first and probed values of the condition, so as to determine a condition discrepancy, and transmit the probed value to the center, where the discrepancy is greater than a pre-determined discrepancy threshold, said center being further configured to modify the first value of the condition upon receipt of the probed value from said at least one probe vehicle, and transmit the modified first value to said at least one receiving vehicle, wherein each probe vehicle is configured to determine and transmit to the center a current time, location, and heading, and said first value of the condition is based on the current time, location and heading, wherein the condition is the anticipated travel speed of a vehicle traveling upon the thoroughfare link, each probe vehicle is configured to transmit a destination input to the center, and the center includes a map database, and is configured to determine an average travel speed for a plurality of thoroughfare links within the database, the current location of the probe vehicle, a recommended route based on the current location and destination input, and the estimated total travel time of the route.

2. The system as claimed in claim 1, wherein the center transmits the modified first value to a plurality of receiving vehicles, which include said at least one probe vehicle.

3. The system as claimed in claim 1, wherein each of a plurality of probe vehicle receives the first value, determines a probe value and discrepancy, and transmits the probed value to the center where the discrepancy is greater than a predetermined discrepancy threshold, and said modified value is cooperatively determined by the plurality of probed values received.

4. The system as claimed in claim 1, wherein said first value of the condition is based on the day of the week, or occurrence of a construction, accident, or sporting event.

5. The system as claimed in claim 1, wherein an intermediary probe station is communicatively coupled to the probe vehicle and center, and configured to receive the probed value from the vehicle, manipulate the value, and then transmit the manipulated value towards the center.

6. The system as claimed in claim 5, wherein the probe station is configured to communicate with a plurality of probe vehicles using SMS communication.

7. The system as claimed in claim 5, wherein the probe station is configured to wirelessly communicate with a plurality of probe vehicles using a DSRC system.

8. The system as claimed in claim 1, wherein the probe vehicle and said at least one receiving vehicle are communicatively coupled to the center by FM or XM radio.

9. The system as claimed in claim 1, wherein the probe vehicle and said at least one receiving vehicle are communicatively coupled to the center through cellular data channels.

10. The system as claimed in claim 1, wherein the probe and receiving vehicles are communicatively coupled to the center by the Internet.

11. The system as claimed in claim 1, wherein a plurality of communicatively coupled and spaced traffic centers are communicatively coupled to a plurality of receiving vehicles, such that each center is coupled to a separate portion of the plurality of receiving vehicles, and each receiving vehicle is communicatively coupled to the most proximate center.

12. The system as claimed in claim 11, wherein each receiving vehicle is further configured to adjustably determine the most proximate center.

13. The system as claimed in claim 1, wherein said first or modified values of the condition are transmitted to the receiving vehicles periodically.

14. An event-triggered traffic control system for updating and communicating at least one condition to at least one receiving vehicle upon a thoroughfare link, wherein the condition presents link specific data, said system comprising:

a traffic information center configured to determine and store a first value of the condition; and at least one probe vehicle communicatively coupled to the center, and configured to determine an event, request the first value from the center only when the event is determined, and determine a probed value of the condition;

said center being configured to transmit to said at least one probe vehicle the first value of the condition upon receiving a request from the probe vehicle, said at least one probe vehicle being further configured to compare the first and probed values of the condition, so as to determine a condition discrepancy, and transmit the probed value to the center, only when the discrepancy is greater than a pre-determined discrepancy threshold, said center being further configured to modify the first value of the condition upon receipt of the probed value from said at least one probe vehicle, and transmit the modified first value to said at least one receiving vehicle upon receiving a request therefrom, wherein the condition is the anticipated travel speed of a vehicle traveling upon the thoroughfare link, each probe vehicle is configured to transmit a destination input to the center, and the center includes a map database, and is configured to determine an average travel speed for a plurality of thoroughfare links within the database, the current location of the probe vehicle, a recommended route based on the current location and destination input, and the estimated total travel time of the route.

* * * * *